United States Patent
Penterman et al.

(10) Patent No.: US 7,561,244 B2
(45) Date of Patent: Jul. 14, 2009

(54) LIQUID-FILLED COMPOSITE WITH SUPPORTING MEMBERS COVALENTY BONDED TO THE SUBSTRATES

(75) Inventors: Roel Penterman, Eindhoven (NL); Stephen Isadore Klink, Eindhoven (NL); Joost Peter André Vogels, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 428 days.

(21) Appl. No.: 10/567,227

(22) PCT Filed: Jul. 5, 2004

(86) PCT No.: PCT/IB2004/051120

§ 371 (c)(1),
(2), (4) Date: Feb. 3, 2006

(87) PCT Pub. No.: WO2005/015294

PCT Pub. Date: Feb. 17, 2005

(65) Prior Publication Data

US 2006/0227262 A1 Oct. 12, 2006

(30) Foreign Application Priority Data

Aug. 6, 2003 (EP) .................................. 03102443

(51) Int. Cl.
*G02F 1/1339* (2006.01)
(52) U.S. Cl. ..................................... 349/155
(58) Field of Classification Search ........................ None
See application file for complete search history.

(56) References Cited

U.S. PATENT DOCUMENTS

| 5,578,351 | A | * | 11/1996 | Shashidhar et al. | ........ | 428/1.23 |
| 5,679,414 | A | * | 10/1997 | Akashi et al. | ............... | 428/1.53 |
| 5,729,318 | A | | 3/1998 | Yamada et al. | | |
| 6,187,440 | B1 | * | 2/2001 | Wu | ............................ | 428/407 |
| 6,211,931 | B1 | * | 4/2001 | Fukao et al. | ................... | 349/86 |
| 6,285,382 | B1 | * | 9/2001 | Wakahara et al. | ........... | 347/112 |
| 6,486,932 | B1 | | 11/2002 | Nakao et al. | | |

FOREIGN PATENT DOCUMENTS

| EP | 0568355 A2 | 11/1993 |
| WO | WO0242832 A2 | 5/2002 |
| WO | WO0248281 A1 | 6/2002 |
| WO | WO0248282 A1 | 6/2002 |
| WO | WO0248783 A2 | 6/2002 |

OTHER PUBLICATIONS

IL Kim et al "New Type of LCD with a Single Glass Substrate" 2002 SID International Symposium. Digest of Technical Papers, pp. 574-577.
Klink, Stephen J. et al "Stratified LCDs: Paintable LCDs Produced by Photo-Enforced Stratification", Proceedings of SPIE, vol. 5003, Apr. 2003, pp. 9-16.

* cited by examiner

Primary Examiner—Richard H Kim

(57) ABSTRACT

A liquid-filled container (1) comprises a first and a second sheet (3, 5) between which a thin film of liquid (7) is dispersed. Supporting members, (9), which extend from the first sheet to the second sheet, are covalently bonded to the first and the second sheet to make the container mechanically robust. In an advantageous embodiment, the thin film of liquid, the supporting members and the second sheet form, in combination, a stratified-phase-separated composite. The liquid-filled container is particularly suitable for use in a liquid crystal display.

11 Claims, 4 Drawing Sheets

LIQUID-FILLED COMPOSITE WITH SUPPORTING MEMBERS COVALENTY BONDED TO THE SUBSTRATES

The invention relates to a liquid-filled container comprising a first sheet, a second sheet, a film of liquid dispersed between the first and the second sheet and supporting members extending from the first sheet to the second sheet.

Liquid-filled containers of the type mentioned in the opening paragraph are known in the art as such. WO 02/42832, for example, discloses such a container in the form of a liquid crystal display laminate. The laminate has a single substrate provided with a cover layer and a liquid crystal layer disposed thereinbetween. The liquid crystal and cover layer form, in combination, a stratified-phase-separated composite. Supporting members are provided which extend from the substrate to the cover layer and form an integral part of the cover layer of the stratified-phase-separated composite.

Although the supporting members significantly improve the mechanical robustness of the laminate, there is still a need to improve the mechanical robustness further. Specifically, the inventors have found the laminate to be vulnerable to lateral and shear stresses. Such stresses develop in particular when the laminate is flexed, such flexure being required in flexible or more particular rollable displays, or is heat stressed e.g. to temperatures above 50° C.

It is an object of the invention to provide, inter alia, a liquid-filled container which is thin yet mechanically robust, in particular one which is robust when lateral or shear stresses are applied and when flexed rendering such containers particularly suitable for applications which require the container to be flexible. The container is to be mechanically robust in the sense of maintaining mechanical integrity and maintaining a substantially constant liquid film thickness when mechanically stressed.

These and other objects are achieved by a liquid-filled container comprising a first sheet, a second sheet, a film of liquid dispersed between the first and the second sheet and supporting members extending from the first sheet to the second sheet, the first sheet on the one hand and the supporting members on the other hand being formed as separate parts, wherein the supporting members are covalently bonded to the first and the second sheet.

The inventors have observed that in conventional liquid-filled containers containing thin films of liquid supporting members break away from the substrate when lateral or shear stresses are applied leading to delamination which becomes particular apparent when submitted to a flexure test. Covalently bonding the supporting members to the first and the second sheet provides a strong adhesion, as a result of which the mechanical robustness of the liquid-filled container is improved. Moreover, the constant spacing provided by the supporting members is substantially maintained and hence the thickness of the liquid film when local pressure is applied even in the case the sheets as such are deformable and/or flexible. Although in a broad sense, the supporting members can be laid out randomly, provision in accordance with a predetermined pattern is preferred.

The liquid film is preferably thin, that it having a thickness typically less than about 5 mm, or more specifically, about 1 mm. It may even have a thickness of about 500 μm, or more particular about 200 μm or less. The minimum thickness is about 0.5 μm or more particular about 1.0 μm.

In a specific embodiment of the liquid-filled container in accordance with the invention, the first sheet has, in accordance with a predetermined pattern and facing the film of liquid, reactive regions and non-reactive regions, the reactive regions being functionalized with chemically reactive groups, and respective supporting members have reactive regions functionalized with chemically reactive groups, the chemically reactive groups of the first sheet and the supporting members having reacted with one another to covalently bond the supporting members to the first sheet at locations where the first sheet contacts the supporting members.

In a more specific embodiment, in addition to the first sheet, a major surface of the second sheet facing the film of liquid is, in accordance with a predetermined pattern, functionalized with chemically reactive groups which have reacted to form covalent bonds with chemically reactive groups of the supporting member at the locations where the major surface contacts the supporting members.

In a particular embodiment of the liquid-filled container in accordance with the invention, the film of liquid and the supporting members form, in combination, a phase-separated composite.

Liquid-filled containers in accordance with this embodiment are particularly easy to manufacture. Polymeric phase-separated composites, or more particular, photo-polymeric phase-separated composites are preferred. Phase-separated composites comprise a (polymeric) solid phase and a liquid (crystal) phase. The (polymeric) solid phase may be formed to have a particular desired shape. (Polymeric) phase-separated composites, phase-separable materials form which such composites can be obtained and methods of manufacturing such composites are well known in the art as such. Polymer dispersed liquid crystals are examples of such composites. Composites wherein the solid phase is formed to have a desired shape are also known, see e.g. U.S. Pat. No. 5,729, 318.

Instead of being formed of separate parts, the second sheet and supporting members may be formed as an integrated whole of covalently bonded material such as a polymer. This has the advantage that the covalent bonding between the second sheet and the supporting members is particularly strong. Such an integrated whole may be conveniently obtained using a stratified-phase-separated composite.

Accordingly, in a preferred embodiment in accordance with the invention, the film of liquid, the second sheet and the supporting members from, in combination, a stratified-phase-separated composite.

Stratified-phase-separated composites are known as such in the art, see e.g. WO 02/42832. Liquid-filled containers in accordance with this embodiment are particularly thin, mechanically robust and flexible. The supporting members can be made with a self-aligned method.

The reactive and non-reactive regions can be arranged in a number of different ways.

In a first embodiment, the first sheet comprises a base film and, provided thereon, a separate, patterned layer which provides the reactive regions in accordance with the predetermined pattern, and wherein regions of the base film exposed by the separate, patterned layer to the film of liquid, provide the non-reactive regions.

In a second embodiment, the first sheet comprises a base film and, provided thereon, a separate, patterned layer which provides the non-reactive regions in accordance with the predetermined pattern, and wherein regions of the base film which are exposed by the separate, patterned layer to the film of liquid provide the reactive regions.

Preferably, the separate, patterned layer is a mono-layer.

The use of mono-layers allows deposition by means of micro-contact printing, a simple yet high-resolution printing method. Also, the mono-layer may, if desired, be covalently bonded to the base film, relatively easy using a solvent-free process known as such.

In a particular embodiment, the separate, patterned layer is covalently bonded to the base film.

The reactive regions are laid out in accordance with a predetermined pattern and the supporting members are formed at those locations. Thus, the supporting members are formed in accordance with the same predetermined pattern. In a broad sense, the shape of individual supporting members, in particular the height and diameter thereof and the total volume occupied by the supporting members is not critical to the invention but is determined by the particular application of the liquid-filled container. Convenient shapes are pillars and walls. Generally, to maximize the amount of liquid which the container can hold, the total volume occupied by the supporting members is to be minimized. However, in general, the smaller the volume, the lesser mechanical robust.

In a further particular embodiment, the supporting members are formed as walls partitioning the film of liquid into a plurality of separate liquid-filled pockets.

Having a wall structure which creates separate liquid-filled pockets provides a liquid-filled container of exceptional mechanical robustness and flexibility. Even when flexed many times to a considerable extent the liquid film thickness remains substantially constant. In many applications this is a significant advantage. For example, it allows flexible or even rollable (liquid crystal) displays to be made. Also, locally applied pressure hardly affects the thickness of the thin liquid film which is of advantage in touch screen applications. In particular, it allows the touch sensing circuitry to be provided on the side facing away from the viewer.

The liquid-filled container in accordance with the invention may, in a broad sense, contain any type of liquid. The liquid may be an inorganic liquid such as water or may be of organic origin. The liquid may be an oil, a paste, a cream, a foam, an ink, an emulsion, a colloid suspension, or other form of liquid containing particles. In a particular advantageous embodiment, the liquid is a liquid crystal.

More in particular, the liquid crystal in the liquid-filled container is switchable between a first and a second state having different optical properties, wherein at least one of the first and the second state is an oriented liquid crystal state. Providing a liquid crystal layer with the capability of being switched from and to such oriented state can be done by conventional means such as electric and magnetic fields. Alternatively, an alignment layer may be used to bring about such oriented state. Accordingly, in a convenient embodiment the first sheet is, on the liquid film side, provided with an alignment layer.

When filled with liquid crystal, the liquid-filled container may be conveniently used in a liquid crystal display. Accordingly, a convenient embodiment is a liquid crystal display comprising a liquid-filled container containing liquid crystal.

Liquid crystal displays in accordance with the invention are thin yet mechanically robust. In fact, the display can be made so thin so as to allow the display to be flexible while maintaining robustness. This is in particular the case when the second sheet and liquid crystal is formed of a stratified-phase-separated composite.

With respect to LC effects which may be used, suitable liquid crystals and other layers which are or may be required in the display such as polarizer layers, electrode layers, first and second sheet materials reference is made to WO 02/42832.

These and other aspects of the invention will be apparent from and elucidated with reference to the drawings and examples described hereinafter.

Figure 1:
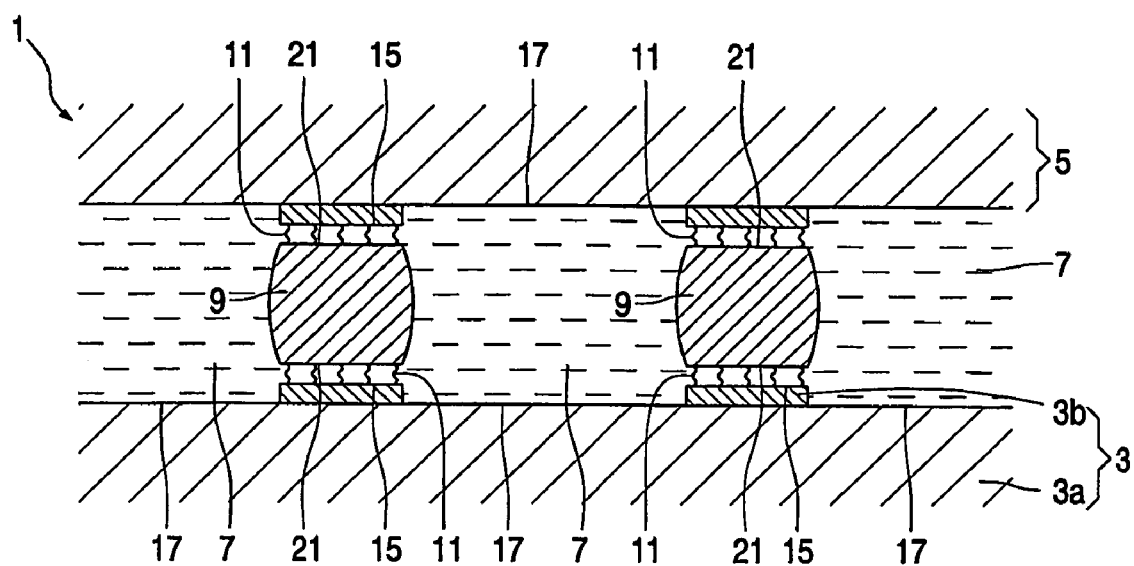
FIG. 1 shows, schematically, in a cross-sectional view, an embodiment of a liquid-filled container in accordance with the invention.

FIG. 1 shows, schematically, in a cross-sectional view, an embodiment of a liquid-filled container in accordance with the invention. The liquid-filled container 1 comprises a first sheet 3 and a second sheet 5. The sheets 3 and 5 are arranged parallel and spaced to accommodate a film of liquid 7. Supporting members 9 extend from the first sheet 3 to the second sheet 5. The supporting members 9, on the one hand, and the first sheet 3, on the other hand, are formed as separate parts. In the embodiment shown in FIG. 1, the supporting members 9 and the second sheet 5 are also formed as separate parts but this is not essential to the invention. The sheet 5 and supporting members 9 may be formed as an integrated whole as further detailed hereinbelow.

The first sheet 3 (and the second sheet 5) has reactive regions 15 and non-reactive regions 17. Schematically indicated by the wavy lines 11, the supporting members 9 are covalently bonded to the first sheet 3 and to the second sheet 5 in the reactive regions 15. The reactive regions 15 are laid out in accordance with a predetermined pattern. The distance between the sheets 3 and 5 and the supporting members 9 is greatly exaggerated to show the covalent bonding clearly. The covalent bonds are formed as a result of the reaction between chemically reactive groups the regions 15 are functionalized with and chemically reactive groups of the supporting members 9.

Figure 2:
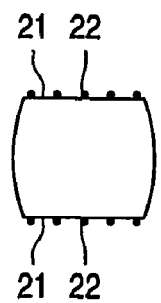
FIG. 2 shows, schematically, a supporting member having regions functionalized with chemically reactive groups.

Referring to FIG. 2, the supporting members 9 have reactive regions 21 functionalized with chemically reactive groups 22. In the embodiment shown in FIGS. 1 and 2, the surface of the supporting members 9 is selectively functionalized at predetermined locations so as to enable the regions 21 to register with corresponding regions 15 of the first sheet 3, this arrangement being preferred but not essential; alternatively the regions 21 may span the entire surface of the supporting members 9.

Figure 3A:
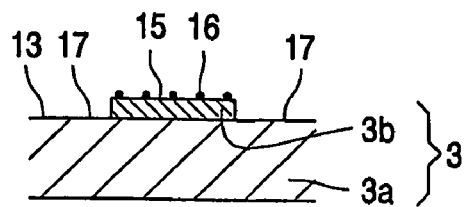
FIG. 3A shows, schematically, a first embodiment of a first sheet having reactive regions functionalized with chemically reactive groups.

Referring to FIG. 3A, on a base film 3a there is provided, in accordance with the predetermined pattern, a separate, patterned layer 3b having a surface functionalized with chemically reactive groups 16. The chemically reactive groups 16 and 22 are capable of reacting with each other to form the covalent bonds 11 shown in FIG. 1.

Figure 3B:
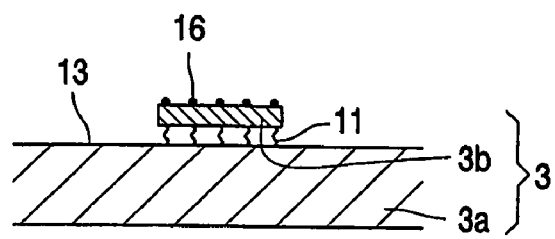
FIG. 3B shows, schematically, a second embodiment of a first sheet having reactive regions functionalized with chemically reactive groups.

In the embodiment shown in FIG. 3A, the regions of the surface of the base film 3a which are not covered by the patterned layer 3b are exposed to the liquid layer 7 and provide the non-reactive regions 17. The patterned layer 3b may be physisorbed on the base film 3a Alternatively, the layer 3b may be chemisorbed on the base film 3a to improve adhesion. Particularly strong adhesion is obtained when the patterned layer 3b is covalently bonded to the base film 3a as shown in FIG. 3B.

Figure 3C:
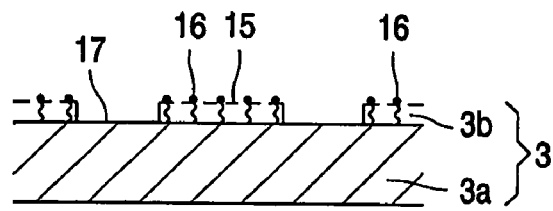
FIG. 3C shows, schematically, a third embodiment of a first sheet having reactive regions functionalized with chemically reactive groups.

Alternatively, as shown in FIG. 3C, a predetermined pattern can be laid out by means of a sheet 3 having a base film 3a provided, in accordance with the predetermined pattern, with a mono-layer 3b functionalized with chemically reactive groups 16 to provide the reactive regions 15. The patterned, separate mono-layer 3b may be physisorbed or chemisorbed on the base film, preferably, the mono-layer 3b is covalently bonded to the base film 3a.

Figure 3D:
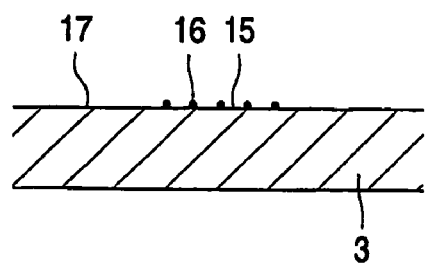
FIG. 3D shows, schematically, a fourth embodiment of a first sheet having reactive regions functionalized with chemically reactive groups.

As shown in FIG. 3D, the reactive regions 15 and the non-reactive regions 17 can also be integrally formed in one and the same layer of the sheet 3 in accordance with the predetermined pattern.

In case the container is part of a display, the layer 3b it may be appropriate to include a black dye in the patterned layer 3b, inter alia to enhance contrast. For this to be effective, the layer 3b needs to have a thickness of about 2 μm or more.

The material of which the sheets 3 and 5 is formed may be the same or different and may in principle be any kind of material capable of containing the liquid. Depending on the application it may be impermeable or permeable to the liquid contained. The sheets 3 and 5 may be made of metal, ceramic or glass or other inorganic material. If the liquid-filled container is to be flexible, synthetic resin is a good choice of sheet material. Combinations of such materials such as in the form of a laminate can also be used. The sheets may need to have functionality other than that of holding the liquid depending on the application. For example, if the liquid-filled container is used in an optical application wherein the container needs to be transmissive, the sheets 3 and/or 5 need to be transparent. If the liquid-filled container is used as part of a liquid crystal display the sheet 3 and/or would typically comprise a variety of layers such as an alignment layer for aligning the liquid crystal electrode layer(s) and polarizer layer(s).

The sheets 3 and 5 typically have a thickness of less than about 5 mm, often less than about 2 mm. A convenient thickness is about 1 mm or less. If a large thickness is used, flexibility is impaired, weight increases and less liquid can be accommodated at a given volume of the container. On the other hand if the thickness becomes too small, say less than about 10 μm, or better less than about 20 μm, the sheet becomes very fragile and hence easily damaged when handled during use or manufacture of the liquid-filled container.

The liquid-filled container in accordance with the invention may, in a broad sense, contain any type of liquid. The liquid may be an inorganic liquid such as water or may be of organic liquid. The liquid may be an oil, a paste, a cream, a foam, an ink, an emulsion, a colloid suspension or other form of liquid containing particles. Depending on the application the liquid may contain functional particles or additives such as dyes, pharmaceuticals or ions.

The liquid film 7 has a thickness typically less than about 5 mm, or more specifically, about 1 mm. It may even have a thickness of about 500 μm, or more particular about 200 μm or less. The minimum thickness is about 0.5 μm or more particular about 1.0 μm.

Apart from being functionalized with chemically reactive groups, the supporting members 9 may be of a conventional nature. Spacers conventionally used in LCDs may be suitably used. The surface of such functionalized is then functionalized with chemically reactive groups. The supporting members can be of any convenient shape such as columns, spheres or rods with long axis arranged parallel to sheet 3. The supporting members may be made of glass, ceramics, metal or any other sort of material. A preferred supporting member material is a synthetic resin, a polymer, because such materials can be functionalized relatively easy.

The supporting members 9 extend from the first sheet 3 to the second sheet 5 thus providing mechanical robustness to the liquid-filled container. The supporting members substantially determine the distance between the sheets and the thus the volume of liquid which can be accommodated. If provided in sufficient density the thickness is maintained even when compressive forces are applied locally at right angles to the sheets. The supporting members also provide resistance against shear and lateral stresses. Because they are covalently bonded to the first and second sheet a mechanically very robust container is obtained.

The height of the supporting members is selected to match the desired liquid film thickness. The width of the supporting members and the volume occupied by the supporting members depends on the application. Typically, to facilitate the patterning process, the width of the supporting members should be more than about 0.1 μm, or, better, 0.2 μm, or still better, 0.5 μm. Supporting members having a width of about 1.0 μm or larger are preferred. Depending on the application the width be about 5 μm or larger or even about 10 μm or larger. The width is preferably less than about 100 μm. Optimizing for mechanical strength, requires the aspect ratio to be at least 0.5 or better at least about 1.0, aspect ratio being defined as width to height ratio. A comfortable aspect ratio is about 5 or more or better about 10 or more. The volume occupied by the supporting members may be about 1% to 20% of the total volume between the sheets 3 and 5.

The chemically reactive 16 and 22 are capable of reacting with each other to form covalent bonds. Conventional synthetic chemistry provides a wealth of combinations of chemically reactive groups which may be suitably used for this purpose. Preferably, photo-chemically reactive groups are used. Also preferred are chemically reactive groups which covalently bond in the form of an addition reaction since then the reaction does not produce any other product. Also preferred are reactive groups which can react under solvent-free conditions.

Suitable examples of chemically reactive groups 22 include but are not limited to double bond containing groups, such as (meth)acrylate and vinyl containing groups such as vinyl ethers. Chemically reactive groups 16 which can react to form covalent bonds with such chemically reactive groups include but are limited to with double bond containing groups, such as (meth)acrylate and vinyl containing groups such as vinyl ethers, amines (in case of an acrylate by means of Michael's addition) and thiols.

Another example is an epoxy group which may be reacted with a hydroxy group, an amine group, a (carboxylic)acid group, and an anhydride or acid chloride of such acid group.

Because the supporting members 9 selectively bond to the reactive regions 15, the supporting members 9 can be laid out in accordance with the predetermined pattern as well. In the broadest sense, any pattern may be used. For example, a plurality of separate supporting members positioned regularly between the sheets or ribs and networks of ribs extending throughout the liquid layer such that all the liquid film is still contiguous throughout. Also, separate pockets of liquid may be formed by having supporting members laid out as a connected grid.

The liquid-filled container generally has sealing means (not shown in FIG. 1) running along the perimeter of the first and second sheet to prevent the liquid from leaking out sideways. Conventional sealing means, such as glue or tape or rubber or metal gasket, may be used for this purpose. Supporting members may also be used to form the sealing means.

In the liquid-filled container of FIG. 1 the second sheet 5 is constructed similar to the sheet 3. This is not essential. For example, the entire surface of sheet 5 may be functionalized with chemically reactive groups instead of pattern-wise. Also, as detailed further below, the sheet 5 may form an integrated whole with the supporting members 9.

The patterned layer 3b functionalized with chemically reactive groups 16 may, for example, be formed of synthetic resin functionalized with the chemically reactive groups mentioned hereinabove. Suitable materials include polymers (in the context of the invention the term "polymer" includes "oligomer", "co-polymer", "ter-polymer" and higher homologues) having pendant double-bond containing groups such as (meth)acrylate groups. Polymers containing pendant amine or hydroxy groups may also use be used. Alternative to polymers, the corresponding monomers may also be used. Typically in such case a photo-initiator is included. Examples of suitable monomers include bisphenol A di(meth)acrylate and tripropyleneglycoldiacrylate.

The patterned layer 3b has a thickness typically ranging form about 1 nm, in the case of a monolayer, to about 100 μm.

A method of manufacturing the liquid-filled container shown in FIG. 1 comprises providing a first sheet 3 comprising a base film 3a provided with a separate, patterned layer 3b. The separate patterned layer 3b has regions 15 functionalized with chemically reactive groups 16. Surface regions of the base film 3a not covered by the patterned layer 3b provide non-reactive regions 17 (see FIG. 3A). The sheet 3 is then brought into contact with an excess of pre-formed supporting member bodies having, as shown in FIG. 2, regions 21 functionalized with chemical reactive groups 22 capable of reacting with the chemically reactive groups 16. The conditions needed to bring about the reaction between the chemically reactive groups 16 and 22 to form the covalent bonds 11 are then brought about, which may involve applying heat and/or radiation and/or immersion in a reaction medium. The reaction medium may comprise a solvent, co-reactants and/or catalysts and or other additives needed to facilitate the desired covalent bond formation. After having formed the covalent bonds, pre-formed supporting member bodies which have not reacted with reactive regions 15 are removed from the sheet 3. A sheet 5 having a structure similar to sheet 3, that is having reactive regions laid out in a pattern corresponding to that of the pattern of the reactive regions 15 of sheet 3, is then placed on the supporting members 9 so that the reactive regions of the sheet 5 register with the reactive regions of the supporting members 9. Proper registration may require the use of alignment marks, use of such marks being known in the art. To maintain alignment during subsequent processing (temporary) fixation means are applied. Optionally, sealing means are applied at this stage. If present, such sealing means may be used to maintain alignment. Using the same or a different method as used for covalently bonding the first sheet 3 to the supporting members 9, the second sheet 5 is covalently bonded to the supporting members 9. If sealing means have not yet been provided, sealing means are provided, wherein a small opening is provided for filling of the empty container so formed with liquid. Filling the empty container with the desired liquid completes the manufacture of the liquid-filled container.

As an alternative to first forming the container and then filling it with liquid, the first sheet 3 may be coated with liquid first and then a second sheet 5 applied.

A sheet 3 having the patterned layer 3b on top of the base film 3b as shown in FIG. 3A may be manufactured by printing the patterned layer 3b on top of the base film 3a. Any printing method may be used for this purpose such as ink jet printing, flexo printing, screen printing, off-set printing, tampon printing and the like. A convenient printing method is tampon printing or micro contact printing. Subtractive deposition methods wherein patterned (photo)resists are deposited may also be used but are not preferred if the base film 3a is sensitive to the processing steps involved.

In order to benefit from the covalent bonding of the sheet to the supporting member, the patterned layer 3b must adhere well to the base film 3a. In the sheet shown in FIG. 3A, the pattern layer 3b adheres physically to the base film 3a. Conventional methods to improve adhesion may be used if adhesion is found to be insufficient. An effective method to improve physical adhesion is to use a solvent in the deposition of the patterned layer which attacks the base film as a result of which, at the interface, patterned layer material can diffuse into the base film material and vice versa This works particularly well if the base film and patterned layer are polymeric because then the polymer chains may get entangled providing a seamless interface. For example, a polyimide base film can be made to strongly adhere to a patterned polyamic ester layer. Covalently bonding the patterned layer to the base film provides good adhesion.

The sheet shown FIG. 3C can be manufactured by micro contact printing onto the base film, a mono-layer of a compound having, on the one hand, chemically reactive groups 16 and, on the other hand, chemically reactive groups capable of reacting, while forming covalent bonds, with chemically reactive groups of the base film 3a. An embodiment of the sheet shown in FIG. 3C is one wherein a micro-contact printed (meth-)acrylate functionalized chlorosilane monolayer reacts with a UV/ozone treated polyimide base film. Another example of such a sheet is a polyvinylalcohol base film of which the OH groups available at the surface have reacted with a patterned micro-contact printed (meth)-acrylatechlorosilane mono-layer. Yet another is where a patterned mono-layer of (meth)-acrylate functionalized thiol is micro-contact printed onto a base film of photo-alignment material having available at its surface double bonds originating for example from a cinnamate or a coumarin.

The silanes of the previous paragraph may also be coupled to base films of an indium tin oxide or glass.

The supporting members 9 may be formed of material similar to the base film of the sheets 3 and 5. Suitable materials include glass and synthetic resin. The various embodiments of the reactive regions shown in FIG. 3A-3D may be used in case of the supporting members 9 as well. For example, FIG. 2 shows, schematically, a supporting member having a surface functionalized with chemically reactive groups corresponding to the embodiment shown in FIG. 3D. Providing regions of the spacers with chemically reactive groups proceeds analogous to providing sheets with such groups.

The supporting members shown in FIG. 2 may be manufactured, for example, by exposing a sheet of supporting member material on both sides to a reaction medium capable of functionalizing the sheet with the functional groups 22, thus functionalizing the major surfaces of the sheet with chemically reactive groups, and then cutting the sheet into pre-formed separate supporting member bodies each having two surfaces 21 arranged opposite one another functionalized with chemically reactive groups 22.

In the manufacture of the liquid-filled container 1, the supporting members 9 may be provided as preformed supporting member bodies, either before, after or simultaneous with the liquid layer 7. Alternatively, the supporting members may be formed in-situ.

Figure 4:
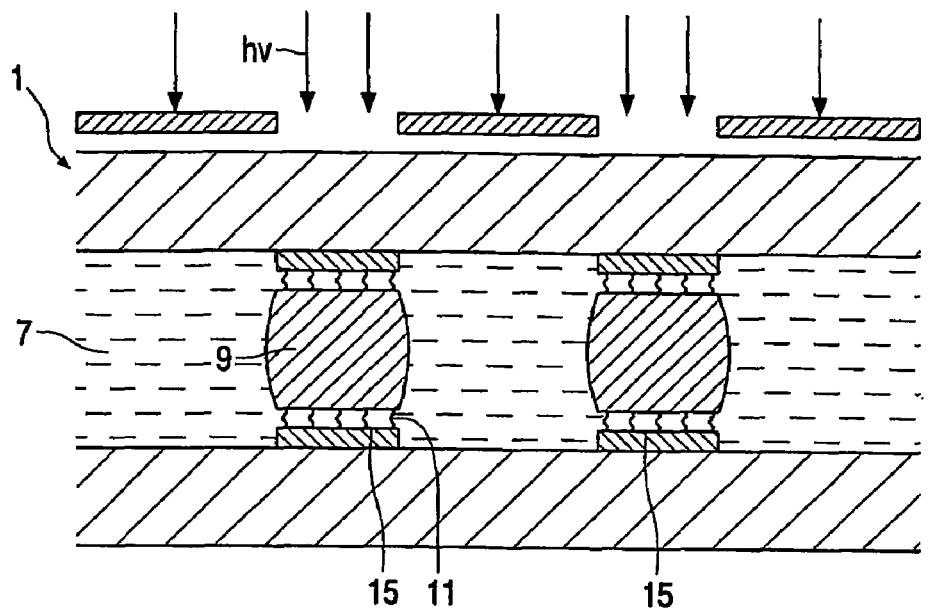
FIG. 4 shows, schematically, in a cross-sectional view, a stage of a method of manufacturing the liquid-filled container shown in FIG. 1.

FIG. 4 shows, schematically, in a cross-sectional view, a stage of a method of manufacturing the liquid-filled container shown in FIG. 1.

In order to allow in-situ formation of the supporting members 9 use is made of phase-separable material which can be brought to phase-separate into a solid phase and a liquid phase, the liquid and solid phase together forming a phase-separated composite. Thus, the liquid layer 7 and the supporting members 9 are formed of phase-separated composite. In the method of which a stage is shown in FIG. 4, use is made of photo-enforceable phase-separable material.

In such material, phase separation is induced about by means of photons, typically ultraviolet light photons. The phase-separation being photo-induced (photo-enforced) is not essential to the invention. Alternatively, thermal and solvent-induced phase separation may also be used. When employing photo-enforced phase-separation, patterned solid phases are easily obtained using a patterned exposure as is shown in FIG. 4.

Preferably, the solid phase is a polymeric phase and the phase-separable material comprises polymerizable material, in particular photo-polymerizable material in which case the phase-separation may be referred to as polymerization induced. In polymerization induced phase separation, the difference in miscibility between on the one hand a monomer (prepolymer) and a liquid and on the other hand the polymer obtainable from the monomer and the liquid is the driving force for phase-separation.

Phase-separable materials, phase-separated composites and methods of obtaining such composites are well known in the art as such. Such known materials, composites and methods may be suitable used in the containers in accordance with the invention and methods of manufacturing the same. For example, polymerization phase-separable material comprising liquid crystal has been used to obtain to polymer dispersed liquid crystals. As another example, photo-polymerization induced phase separation has been used to produce polymeric walls in a liquid crystal cell, see e.g. U.S. Pat. No. 5,729,318.

If (polymerization-induced) phase-separable material is used to manufacture the liquid-filled container, the material from which the (polymeric) solid phase is obtained is functionalized with chemically reactive groups capable of reacting with the chemically reactive groups of the sheet to form covalent bonds. In case of polymerization-induced phase-separable material, such chemically groups may be different from but are preferably the same as the polymerizable groups of the phase-separable material. Suitable chemically reactive groups and (polymeric) materials and liquids have been described hereinabove.

Preferred polymerizable materials for use in polymerization-induced phase-separable materials include monomers capable of addition polymerization such as monomers including double bonds such as vinyl containing monomers, for example styrene, (meth)acrylates, vinylethers. Such double bonds can be reacted with sheets functionalized with, for example, double bonds, such as acrylates, or thiols or amine groups. A combination of monomers containing thiol groups and vinyl groups to obtain thiolenes may also be used. Thiolenes may be used in combination with sheets functionalized with thiol groups or vinyl groups or amine groups or acrylate groups. Epoxy-group containing monomers may also be used. Such groups can react with sheets functionalized with epoxy groups or amines (organic) acids, anhydrides or acid chlorides of such acids.

Figure 5:
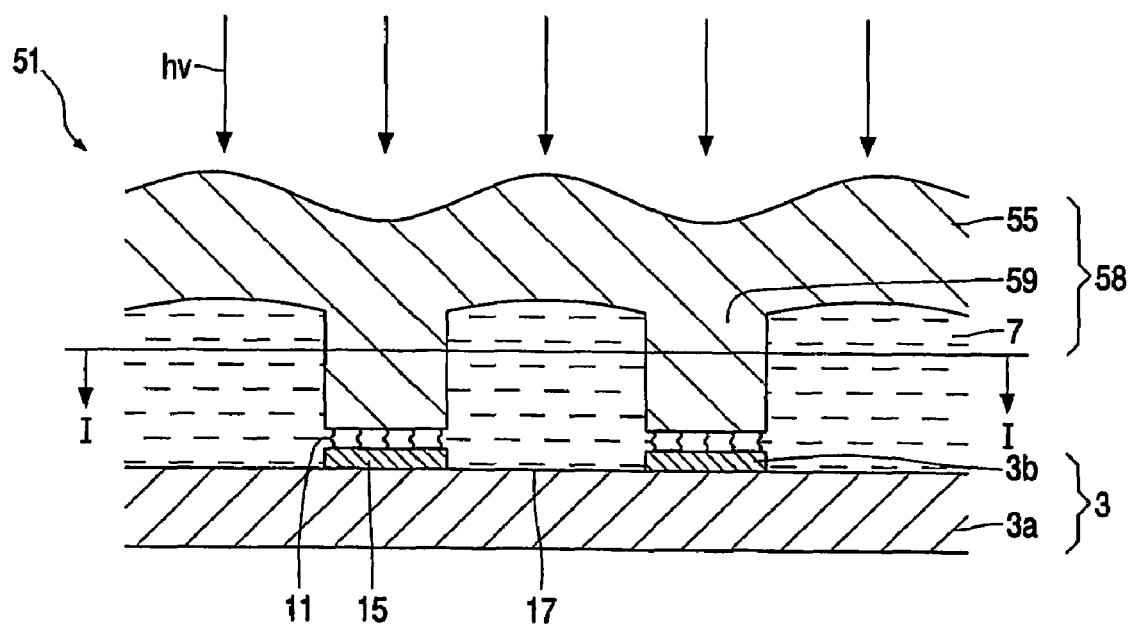
FIG. 5 shows, schematically, in a cross-sectional view, a stage of a method of manufacturing another embodiment of a liquid-filled container in accordance with the invention.

FIG. 5 shows, schematically, in a cross-sectional view, a stage of a method of manufacturing another embodiment of a liquid-filled container in accordance with the invention.

The liquid-filled container 51 shown in FIG. 5 differs from the liquid-filled container 1 shown in FIG. 1 in that in the embodiment 51 the second sheet and the supporting members form an integral whole in which a sheet section 55 and supporting member sections 59 are distinguishable.

The sheet section 55, supporting member sections 59 and liquid layer 7 together form a stratified-phase separated composite 58. Use of a stratified-phase-separated composite has the advantage that, because the sheet section 55 is formed in-situ, the liquid-filled container can be much thinner than when a separate sheet is used. This renders the liquid-filled container particularly flexible while maintaining mechanical robustness.

The thickness of the stratified-phase-separated composite can be anything between 1 and 200 μm, or better 2 to 150 μm, or still better 3 to 100 μm. A preferred range is 5 to 50 μm, or even more preferred 10 to 30 μm. The liquid crystal layer of the stratified-phase-separated composite can have a thickness of 0.5 to 20 μm or preferably 1 to 10 μm.

Stratified-phase separated composites, methods of obtaining such and materials from which such composites can be obtained are known in the art as such. See e.g. U.S. Pat. No. 6,486,932, WO 02/42832, WO 02/48281, 02/48282 and 02/48783. Such known composites, methods and materials can be suitably used in the liquid-filled containers of the present invention provided such composites and materials comprise chemically reactive groups which have reacted or are capable of reacting with chemically reactive groups of the reactive regions 15 of the sheet 3 to form covalent bonds 11. In case of polymeric stratified-phase-separated composites, the chemically reactive group is preferably a polymerizable group.

Specific examples of stratified-phase separable material are those described hereinabove in relation to phase-separable material.

According to the prior art cited above, in order to get a phase-separated composite to stratify special measures are taken. The special measure may be to use a first and second sheet which have a differential wetting for liquid and solid material. It may also involve adding a dye to a photo-phase separable material, which has the effect of establishing an intensity gradient at right angles to layers to be formed.

In the stage shown in FIG. 5, the liquid-filled container being manufactured is subjected to a flood exposure. Surprisingly, this still results in the supporting members being formed in accordance with the predetermined pattern. Further details are described in a patent application concurrently filed by Applicant entitled "Polymeric stratified-phase-separated composite and method of manufacturing the same".

Figure 6:
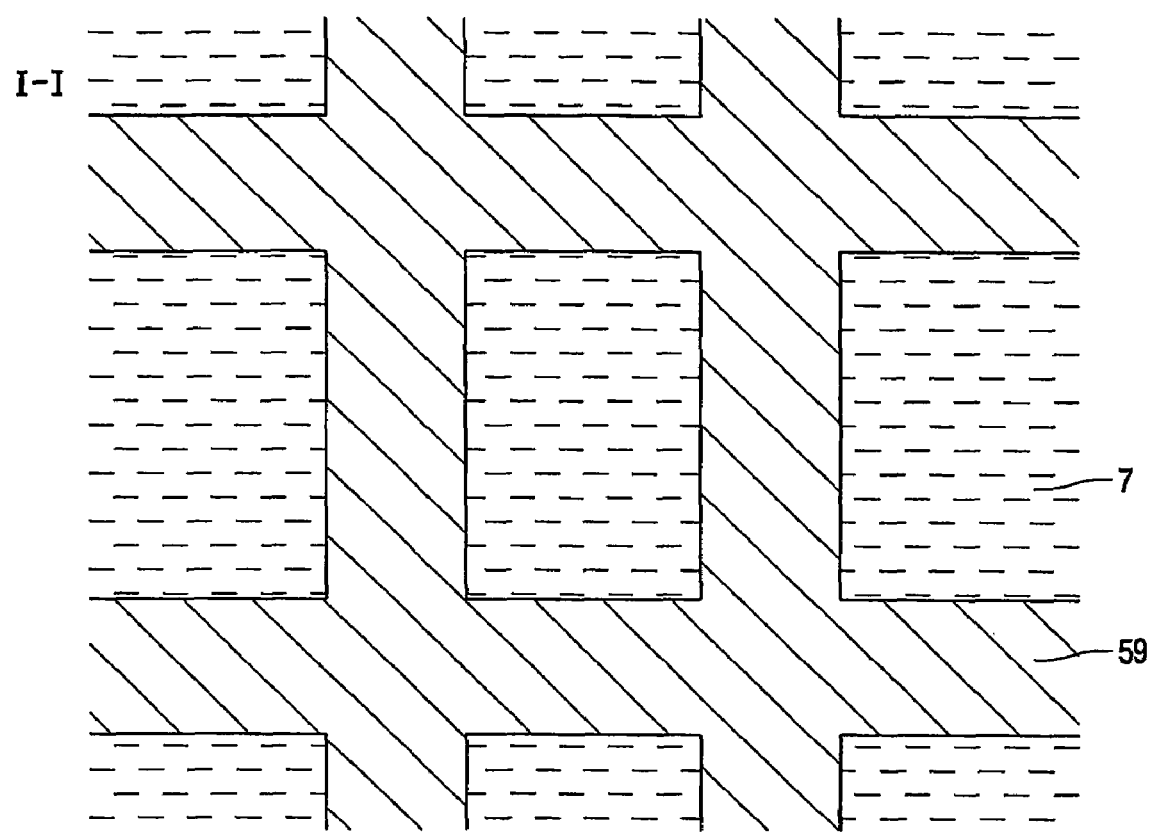
FIG. 6 shows, schematically, a top view of the liquid-filled container of FIG. 5 along the line I-I.

FIG. 6 shows, schematically, a top view of the liquid-filled container of FIG. 5 along the line I-I. The supporting members sections 55 are laid out as a rectangular grid partitioning the liquid layer 7 into a plurality of separate liquid-filled pockets. Instead of rectangular the liquid-filled pockets may be hexagonal or round such as circular or other form. Supporting members so laid out on a connected grid provide the liquid-filled container with exceptional robustness allowing very thin and thus flexible liquid-filled containers to be constructed. Moreover, since the pockets are separated from one another by the supporting members no liquid can flow from one pocket to the another. This has the advantage that a constant thickness of the liquid-filled container is maintained even when local pressure is applied to a major surface of the container. For many applications, display applications being a prime example, this is an important property. Obviously, if desired, a plurality of separate supporting members (pillars) can also be used.

The invention is of particularly use when stratified-phase-separated composites are used. In order for the stratification process to proceed as desired the solid layer has to form on top of the liquid layer. In order to achieve this it is important that the solid layer being formed does not have a high affinity for the sheet 3. On the other hand, to get a robust container it is important that the supporting members which are also formed of solid phase adhere well to the sheet 3. These are conflicting requirements. The present invention resolves this conflict. Because the sheet is functionalized with chemically reactive groups, the issue of adhesion of the composite to the sheet can be optimized separately from the optimization of stratification leading to containers with improved robustness.

The liquid-filled containers in accordance with the invention are suitable for use in displays based on fluids such as electro-wetting and electrophoretic displays, and liquid crystal displays in particular.

A preferred liquid is a liquid crystal, more particular a liquid crystal which can be brought into states of different optical properties. States having different optical properties can be obtained by orienting the liquid crystal. This can be done by means known in the art as such. A preferred such means is an alignment layer which is provided on the first sheet 3. If desired the second sheet 5 or sheet section 55 may also be provided with an alignment layer.

Liquid-filled containers comprising (oriented) liquid crystals which can be switched between states of having different optical properties can be suitably used in liquid crystal displays. In such a case the first sheet and optionally the second sheet will have composite structure including besides alignment layers, electrode layers, retardation, color filter layers, active matrix circuitry and the like. In case of stratified-phase-separated composite comprising containers used in displays reference is made to WO 02/42832.

EXAMPLE 1

A thin liquid-filled container as shown in FIG. 1 is manufactured as follows:

A glass substrate provided with active matrix in-plane switching circuitry is coated with a polyimide layer (AL 3046, JSR) which is rubbed to obtain an alignment layer thus forming a base film 3a.

A patterned layer 3b is formed by micro-contact (tampon) printing, more particularly by providing a glass substrate with a layer of a photo-sensitive polyamic ester (Durimide 7505, Arch Chemicals) by means of spin-coating (10 s at 100 rpm, 30 s at 3000 rpm). The structural formula of the polyamic ester is:

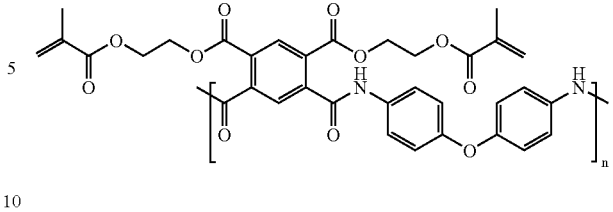

A polydimethylsiloxane stamp provided with a 4 by 5 cm square grid pattern wherein the grid lines are each 50 µm wide, each 100 µm high and spaced 500 µm apart in both directions (heart to heart distance) is inked by contacting the stamp with the wet polyamic ester layer and then contacting the stamp with the base film 3a on the alignment layer side thus transferring the ink onto the base film 3a. After removal of the stamp, the inked base film 3a is heated on a hot plate at 90° for about 10 minutes to evaporate solvent thus obtaining a sheet 3 of a type shown in FIG. 3A. The sheet 3 comprises a base film 3a and provided thereon a separate, patterned layer 3b of polyamic ester, the separate, patterned layer 3b providing reactive regions 15 functionalized with chemically reactive groups 16 which is this example are methacrylate groups. The regions exposed by the layer 3b are the non-reactive regions 17 and expose alignment layer surface.

The predetermined pattern of the patterned layer is similar to that shown in FIG. 6 and is a square grid, each grid line being 50 µm wide and 500 µm (heart to heart distance). The thickness is measured to be about 150 nm.

Using an Erichsen doctor blading apparatus, the first sheet 3 is provided with a thin (about 30 µm) film of a stratified-phase-separable material of the following composition: 50 wt % liquid crystal E7 (a mixture of several cyano-substituted biphenyls and a cyano-substituted terphenyl, marketed by Merck), 44.5 wt % isobornylmethacrylate (Sartomer), 0.5 wt % photo-initiator Irgacure 651 (Ciba Geigy) and 4.5 wt % of (E)-4,4'-di-(6-methacryloyloxyhexyloxy)-3-methylstilbene synthesized as described in WO 02/42832.

The stratified-phase-separable material has photo-polymerizable methyacrylate groups. The patterned layer 3b provides regions functionalized with methacrylate groups. Methacrylate groups are capable of reacting with another. Thus, chemically reactive groups are provided which are capable of reacting with the chemically reactive groups of the patterned layer 3b.

The thin layer of stratified-phase-separable material is subjected to a flood exposure using ultraviolet light (Philips TL08, 0.3 mW/cm$^2$) at a temperature of 50° C. in a nitrogen atmosphere for 30 minutes. The UV photons induce polymerization of the methacrylate monomers. As polymerization proceeds, polymerized material is formed the molecular weight of which increases over time to the point where the polymerized material is not miscible any more with the liquid crystal and which point phase-separation occurs. The stratified-phase-separable material absorbs the UV radiation (substantially by means of the stilbene compound and the photo-initiator) and an intensity gradient is established, the highest intensity being found closest to the radiation source. This gradient is the driving force of stratification. The absorption of the film of stratified-phase-separable material is such that UV photons also reach the interface of the patterned layer 3b and the film of stratified-phase-separable material, thus initiating reaction between methacrylate groups of the stratified-phase-separable material and the methacrylate groups of the patterned layer 3b. As a result of this reaction, covalent bonds are established between the patterned layer 3b and the supporting members being formed in-situ.

After irradiation, a stratified-phase separated composite 58 is formed. The composite 58 comprises a thin oriented liquid crystal film 7 of separate LC pockets of approximately hemispherical shape each having a maximum thickness of 10 μm. The composite 58 further comprises a solid phase comprising a sheet section 55 and supporting member sections 59.

The display so obtained is examined under a polarization microscope. The pockets with filled liquid crystal and the supporting member sections 59 are clearly distinguishable. In some areas, birefringent effects are observed indicative of the presence of liquid crystal, whereas in other areas the image is consistent with what is normally observed for optically isotropic material indicative of the presence of supporting member material.

The display so obtained has oriented liquid crystal which can be switched by means of the active matrix in-plane switching circuitry to display an image. Exerting pressure on the display at the viewing side with a finger does not result in any image distortion as would be observed in conventional LC displays evidencing the excellent mechanical robustness of the display in accordance with the invention.

Furthermore, after heat stressing the display at 90° C. for several hours the display is still operational. Conventional displays comprising stratified-phase-separated composites, that is those having supporting members 59 which are not covalently bonded to the sheet 3 do not survive such test.

EXAMPLE 2

A liquid-filled container identical to that of Example 1 is manufactured except that, instead of a glass substrate with active matrix circuitry, a polymer substrate (an engineered polycarbonate foil from Teijin, type DT 120 B 60) designed for use in plastic LCDs is used.

When examined under a polarization microscope substantially the same image as is observed in Example 1, is observed so far as the supporting member and liquid crystal film is concerned.

The liquid-filled container is then subjected to a flexure test by flexing, by hand, the container to a bending radius of about 1 cm and then relaxing it to its original shape. This procedure is repeated at least 20 times.

Thereafter, the liquid-filled container is again examined with a polarization microscope. The image observed is substantially the same as that observed before the flexure test clearly indicating the mechanical robustness of the liquid-filled container in accordance with the invention.

EXAMPLE 3

(Not in Accordance with the Invention)

Example 2 is repeated with the difference that the patterned layer 3b with the reactive regions is dispensed with. In order to obtain supporting members in accordance with the predetermined pattern a pattern-wise exposure is used. A modified flood exposure is used to induce stratification.

Specifically, in the pattern-wise exposure, the film of stratified-phase-separable material is irradiated through a mask with a high-intensity light near-UV source (Philips UHP, 10 mW/cm$^2$) for 3 minutes in a nitrogen atmosphere. The distance between UV source and the mask is about 40 cm, distance between the mask and the film is 1 mm. In the light path a diffuser is placed (10 cm from the UV source) to obtain more homogeneous illumination conditions. During the pattern-wise exposure, a square grid of supporting member sections 55 is formed.

In the second flood exposure, the film is exposed to near-UV light of much lower intensity (Philips TL08, 0.3 mW/cm$^2$) at a temperature of 50° C. in a nitrogen atmosphere. In this exposure, the material in the areas between the supporting members phase-separate in a stratifying manner thus forming a polymeric layer 55 and the liquid crystal layer 7.

The liquid-filled container so obtained is examined by polarization microscopy. An array of separate liquid crystal filled pockets is observed enclosed by a square grid of supporting member sections 59 laid out in accordance with the pattern of the pattern-wise exposure.

The liquid-filled container so obtained is subjected to the flexure test of Example 2.

After the flexure test, the liquid-filled container is again examined with the polarization microscope. It is observed that a significant proportion of the supporting members 59 has been dislodged from their original position. The liquid crystal pockets are no longer nicely separated, liquid crystal can flow from pocket to another. This dramatically affects the (electro) optical properties of the container, such as its contrast and color point of the bright state, as well as its mechanical properties, such as the capability to maintain a constant liquid film thickness when pressure is applied and resistance against lateral forces.

EXAMPLE 4

A liquid crystal display having a liquid-filled container as shown in FIGS. 5 and 6 is manufactured as follows:

A polymer foil (an engineered polycarbonate foil from Teijin, type DT 120 B 60) is provided with an in-plane switching ITO electrode structure. The electrodes can be addressed by direct addressing. The polymer foil is on the electrode side coated with a silicon nitride (SiN$_x$) passivation layer of about 100 nm thickness. On top of the nitride layer a polyimide alignment layer (AL 3046, JSR) is provided, completing the manufacture of a base film 3a.

In accordance with the method of Example 1, the base film 3a is provided with a patterned layer 3b of polyamic ester having methacrylate groups. The first sheet 3 so obtained has reactive regions functionalized with chemically reactive groups. The patterned layer is laid out in a square grid with 50 μm wide lines and 500 μm apart (heart to heart distance).

Using the method of Example 1, the first sheet 3 is provided with an about 30 μm film of stratified-phase-separable material having the composition: 50 wt % liquid crystal material E7 (Merck), 44.5 wt % isobornylmethacrylate (Sartomer), 0.5 wt % photo-initiator Darocure 4265 (Ciba Geigy), 5.0 wt % stilbene dimethacrylate. Exposure with UV light (Philips TL08, 0.3 mW/cm$^2$) at a temperature of 50° C. in a nitrogen atmosphere for 30 minutes results in the formation of a stratified phase-separated composite 58 having a sheet section 55, supporting member sections 59 and a liquid crystal film 7.

On the sheet section 55, an about 20 μm thick planarizing layer of tripropylene glycol diacrylate is applied using a doctor blade. The planarizing layer is cured with UV light (Philips HPA: 4 mW/cm$^2$, 10 minutes). Finally, two coatable water-born polarizers (Optiva Inc.) are coated with the Mayer's Rod coating technique on each side of the layer stack: one on top of the planarizing layer, the other on the back of the first sheet 3.

The LC display so manufactured is rolled on a cylinder with a radius of 1 cm and then unrolled while displaying a desired image. This procedure is repeated over a thousand times. During a cycle of this flexure test the image displayed does not change. Furthermore, during the entire flexure test, no degradation of the image displayed is observed. This evidences the excellent mechanical robustness of the display in accordance with the invention.

The invention claimed is:

1. A liquid-filled container comprising a first sheet, a second sheet, a film of liquid dispersed between the first and the second sheet and supporting members extending from the first sheet to the second sheet, the first sheet on the one hand and the supporting members on the other hand being formed as separate parts, wherein the supporting members are covalently bonded to the first and the second sheet, wherein the first sheet has, in accordance with a predetermined pattern and facing the film of liquid, reactive regions and non-reactive regions, the reactive regions being functionalized with chemically reactive groups, and respective supporting members have reactive regions functionalized with chemically reactive groups, the chemically reactive groups of the first sheet and the supporting members having reacted with one another to covalently bond the supporting members to the first sheet at locations where the first sheet contacts the supporting members.

2. A liquid-filled container as claimed in claim 1 wherein the film of liquid and the supporting members form, in combination, a phase-separated composite.

3. A liquid-filled container as claimed in claim 2 wherein the film of liquid, the second sheet and the supporting members from, in combination, a stratified-phase-separated composite.

4. A liquid-filled container as claimed in claim 1 wherein the first sheet comprises a base film and, provided thereon, a separate, patterned layer which provides the reactive regions in accordance with the predetermined pattern, and wherein regions of the base film exposed by the separate, patterned layer to the film of liquid, provide the non-reactive regions.

5. A liquid-filled container as claimed in claim 4 wherein the separate, patterned layer is a mono-layer.

6. A liquid-filled container as claimed in claim 4, wherein the separate, patterned layer is covalently bonded to the base film.

7. A liquid-filled container as claimed in claim 1 wherein the first sheet comprises a base film and, provided thereon, a separate, patterned layer which provides the non-reactive regions in accordance with the predetermined pattern, and wherein regions of the base film which are exposed by the separate, patterned layer to the film of liquid provide the reactive regions.

8. A liquid-filled container as claimed in claim 1, wherein the supporting members are formed as walls partitioning the film of liquid into a plurality of separate liquid-filled pockets.

9. A liquid-filled container as claimed in claim 1, wherein the liquid is a liquid crystal.

10. A liquid-filled container as claimed in claim 9 wherein the first sheet is, on the side facing the liquid film, provided with an alignment layer.

11. A liquid crystal display comprising a liquid-filled container as claimed in claim 9.

* * * * *